United States Patent [19]

Purdy et al.

[11] Patent Number: 4,497,637

[45] Date of Patent: Feb. 5, 1985

[54] THERMOCHEMICAL CONVERSION OF BIOMASS TO SYNGAS VIA AN ENTRAINED PYROLYSIS/GASIFICATION PROCESS

[75] Inventors: Kenneth R. Purdy, Decatur; Charles W. Gorton; James A. Knight, Jr., both of Atlanta, all of Ga.

[73] Assignee: Georgia Tech Research Institute, Atlanta, Ga.

[21] Appl. No.: 443,335

[22] Filed: Nov. 22, 1982

[51] Int. Cl.³ .............................. C10J 3/46; C10J 3/48; C10J 3/86

[52] U.S. Cl. .................................. 48/111; 48/197 R; 48/209; 252/373

[58] Field of Search ...................... 48/209, 206, 197 R, 48/200, 111; 201/22, 23, 2.5; 208/8 R; 252/373

[56] References Cited

U.S. PATENT DOCUMENTS

| | | | |
|---|---|---|---|
| Re. 29,312 | 7/1977 | Mallan et al. | 48/209 |
| 3,039,955 | 6/1962 | Honnold, Jr. | 48/197 R |
| 3,963,426 | 6/1976 | Hand | 48/197 R |
| 3,966,633 | 6/1976 | Friedman | 48/197 R |
| 3,971,635 | 7/1976 | Matthews | 48/197 R |
| 4,013,428 | 3/1977 | Babbit | 48/202 |
| 4,030,895 | 6/1977 | Caughey | 48/111 |
| 4,077,847 | 3/1978 | Choi et al. | 48/209 |
| 4,078,973 | 3/1978 | Choi et al. | 201/21 |
| 4,095,958 | 6/1978 | Caughey | 48/111 |
| 4,234,408 | 11/1980 | Duncan | 208/8 R |
| 4,247,302 | 1/1981 | Woldy et al. | 48/206 |

Primary Examiner—S. Leon Bashore
Assistant Examiner—K. M. Hastings
Attorney, Agent, or Firm—Newton, Hopkins & Ormsby

[57] ABSTRACT

Biomass feedstock raw material is converted to synthesis gas by drying and sizing biomass raw material, pyrolyzing the processed biomass in intimate mixture with inert gases such as combustion products, thereby obtaining a product mixture of char, pyrolysis oil, and pyrolysis gas, and gasifying the char and some of the pyrolysis oil in the presence of steam and oxygen at a temperature sufficient to form the synthesis gas product substantially comprising carbon monoxide and hydrogen.

23 Claims, 1 Drawing Figure

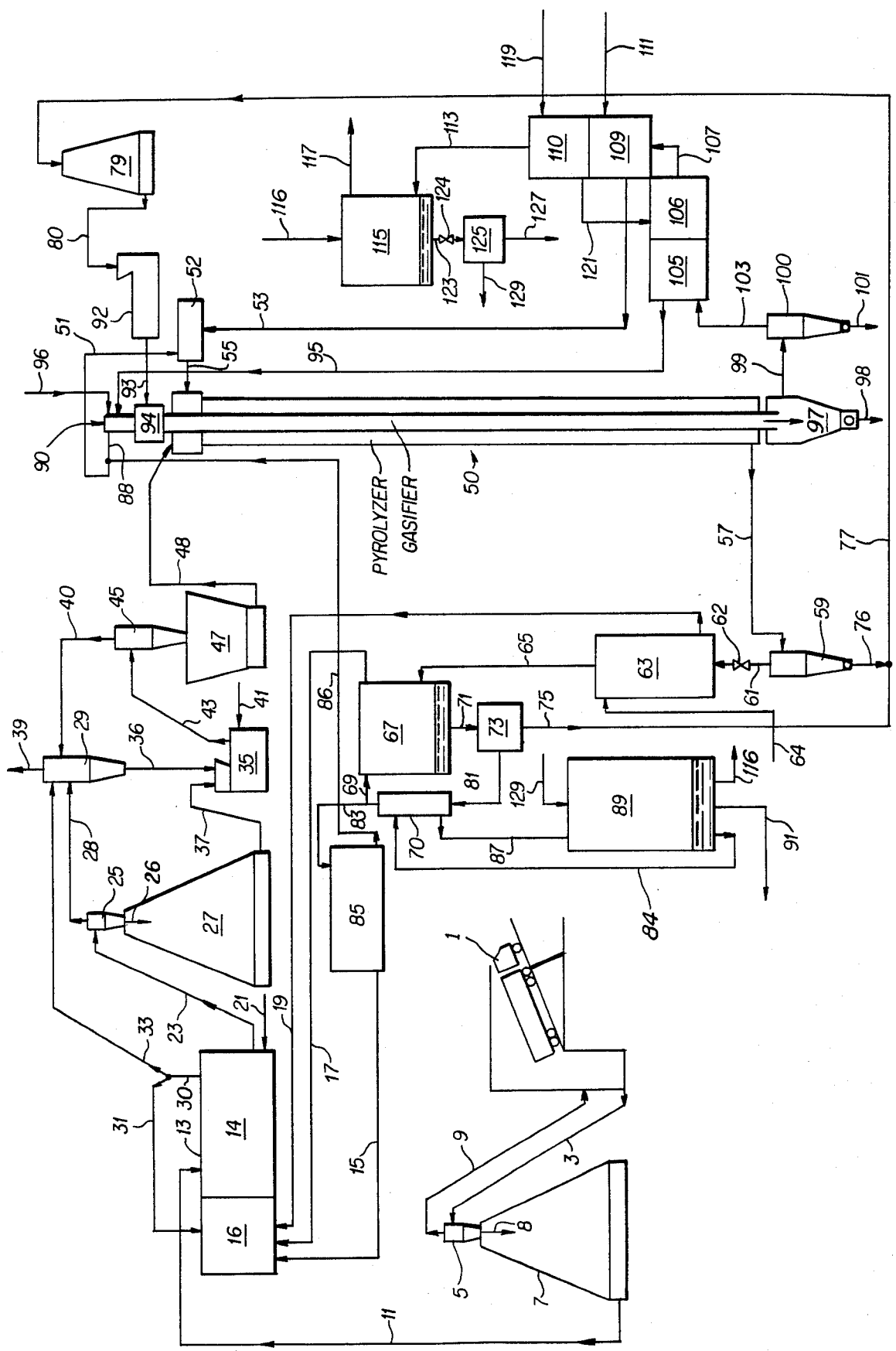

THERMOCHEMICAL CONVERSION OF BIOMASS TO SYNGAS VIA AN ENTRAINED PYROLYSIS/GASIFICATION PROCESS

BACKGROUND OF THE INVENTION

1. Field of the Invention

The present invention relates to a method for converting biomass raw materials to synthesis gas composed chiefly of carbon monoxide and hydrogen.

2. Description of the Prior Art

Many techniques are known for converting biomass into a synthetic gaseous fuel and inert ash residue. Normally, a biomass raw material which can be either organic waste, residues or biomass grown specifically as a chemical feedstock is introduced into a vertical-bed reactor with sufficient air or oxygen at a temperature sufficient to gasify the biomass to yield a combustible gas and an inert ash. In some systems, steam is added to the mixture in the gasifier to form the synthesis gas during pyrolysis of the biomass. For instance, Mallan et al in U.S. Pat. No. 29,312, illustrate a gasification technique in which a mixture of water, carrier gas, char and particulate carbonaceous solids is passed into a pyrolysis reactor where the mixture is heated to a temperature ranging from about 1200° F. to 2500° F. The temperature of the pyrolysis zone is maintained at a level to optimize the yield of organic chemical and fuel values in the material discharged from the pyrolysis zone which is composed of char, volatilized organic fuel and chemical values, product gas and carrier gas. At least a portion of the hot char obtained can be recycled to the pyrolysis zone as a heat source. On the other hand, excess char particles can be degasified to yield a hydrogen rich gas or the char can be briquetted. A disadvantage of the process is that in the pyrolysis of the organic material, a complex product mixture is obtained of solid, condensable gas and non-condensable gas materials. Synthesis gas is not a product of pyrolysis.

The Choi et al reference, U.S. Pat. No. 4,078,973, shows the pyrolysis of particulate organic solid wastes in an oxygen free carrier gas in which hot char is used as a heat source for the pyrolysis. The char is burned in air and the flue gas therefrom heats the particles sent to the pyrolysis unit and the material exiting the pyrolysis zone consists of a complex mixture of gases, pyrolytic oils and char. It is evident, however, that a relatively simple gaseous fuel mixture such as synthesis gas is not produced.

Honnold, Jr., in U.S. Pat. No. 3,039,955, discloses a pyrolysis process in which one of a variety of fossil fuel materials such as coal, oil, shale, lignite, peat, various petroleum fractions and the like is introduced into a pyrolysis reactor in admixture with steam. Also introduced into the reactor is a stream of hot gases containing entrained coke solids. Pyrolysis of the carbonaceous feed or hydrocarbon feed material produces a solid product and a product off-gas containing hydrogen and a complex mixture of the condensable and non-condensable hydrocarbon gases. Synthesis gas consisting of hydrogen and carbon monoxide is not produced by the pyrolysis reaction.

The Caughey reference, U.S. Pat. No. 4,030,895, discloses a technique of synthesizing a combustible gas product from a biomass material. In the method green wood chips are dried and then pyrolyzed in a gasifier in the presence of air. However, the gaseous product produced by the one step pyrolysis process largely consists of carbon monoxide formed by the partial oxidation of carbon. The gas product also contains gaseous components which are formed by the destructive distillation of the biomass material. The process, however, does not produce synthesis gas as either a primary or secondary gaseous product.

Still another reference, Hand, U.S. Pat. No. 3,963,426, shows a technique of gasifying coal and other carbonaceous materials such as lignite, manure, saw dust, or the like to form a synthesis gas product. In the process, the carbonaceous raw material is dried with hot synthesis gas and the dried material is pyrolyzed in a one-step process in the presence of an oxygen bearing gas-steam mixture, wherein the steam is derived from the moisture bearing synthesis gas, to prepare a synthesis gas product. However, the synthesis gas is contaminated with an inert gaseous component such as nitrogen and contains significant quantities of carbon dioxide and other gas components. In another technique of coal gasification, Babbit in U.S. Pat. No. 4,013,428, shows a process for gasifying coal in which a fuel such as hydrogen is burned with air to produce steam. The steam mixes with powdered coal in a gasifier and a synthesis gas product is formed by the reaction of steam with the coal. However, the synthesis gas product contains inert gaseous materials such as nitrogen as well as carbon dioxide. Moreover, the process is directed to the use of coal as a raw material which is significantly different in composition from such cellulose based biomass materials as wood chips, saw dust and the like which yield a product gas of different composition upon gasification than coal.

Generally speaking, prior art techniques of gasifying biomass materials give rise to a product off-gas stream which is a complex mixture of hydrogen, carbon dioxide, methane, carbon monoxide, nitrogen, water vapor, other low molecular weight hydrocarbon gases such as ethane and propane, condensable organic compounds and tar forming materials. While it is apparent that such a generated off-gas could be used as a fuel, serious problems are encountered in the gasifier used in such processes through tar formation and because of the condensation of liquid organic and aqueous phases in the system. Yet another disadvantage of the prior art biomass conversion processes is that the non-condensable gases formed upon gasification are a complex mixture from which it would be very difficult to recover only carbon monoxide and hydrogen by a necessarily complex process. Generally, in the past, both biomass and char have been thermally degraded in the same reactor which is the reason why a complex mixture of gases is produced as the gaseous pyrolysis product. Still another drawback of the conventional conversion processes is that air is generally used to provide the source of oxygen which appears in the product gas. Therefore, nitrogen is necessarily introduced into the gaseous product obtained, and in order to convert the gaseous product to syngas (synthesis gas), nitrogen must be removed.

Considering at this point the gasifiers which have been used in the past for the partial oxidation of biomass materials to a product gas, the gasifiers have been normally designed in a fashion such that thermal decomposition of biomass material occurs initially to yield volatile off-gases and a char. The initial decomposition occurs by the heat provided by partial oxidation of the off-gases. Gasification of the char then occurs by reaction of the char with oxygen to produce a mixture of carbon monoxide and carbon dioxide. However, the temperatures reached during the oxidation process can be high enough to cause slagging of the ash. While the gasifier can be operated under conditions such that not all of the char is oxidized, this leads to significant reduction in the yield of product gas and therefore inefficiency of operation. In this regard, Caughey in U.S. Pat. No. 4,095,958, discloses a retort for the pyrolysis of biomass material wherein it is indicated that the temperature of the grate of the retort must be maintained below the fusion temperature of the ash and this can be accomplished by the expediency of supplying an excess of primary air to the plenum chamber at the lower end of the grate so that it flows upwardly along the downwardly facing side with the surplus air being discharged at the top of the retort. The grate is also provided with a plurality of small openings and fins on the downward facing side of the grate perpendicular to the plane of the underside of the grate which extends into the flow path of the primary air. In view of the problems encountered in the prior art for converting biomass to usable fuels, a need continues to exist for a method by which biomass material can be pyrolyzed and gasified directly to synthesis gas composed of hydrogen and carbon monoxide.

SUMMARY OF THE INVENTION

Accordingly, one object of the present invention is to provide a method of converting biomass material directly to synthesis gas without the necessity of having to treat a complex mixture of gases by a complex process in order to isolate hydrogen and carbon monoxide therefrom.

Another object of the present invention is to provide a technique of converting biomass material to synthesis gas which avoids slagging of the ash produced during gasification of the char.

Briefly, these objects and other objects of the present invention as hereinafter will become more readily apparent can be attained by a method for converting biomass raw material to synthesis gas by drying and grinding the biomass raw material; pyrolyzing the processed biomass in intimate mixture with a hot inert gaseous mixture, thereby obtaining a product mixture of char, pyrolysis oil, and pyrolysis gas; and gasifying the pulverized char with pyrolysis oil in the presence of oxygen and steam at a temperature sufficient to form the synthesis gas product substantially comprising of carbon monoxide and hydrogen.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

The FIGURE shows an embodiment of the apparatus and material flow arrangement for converting biomass feedstock to synthesis gas.

DETAILED DESCRIPTION OF THE PREFERRED EMBODIMENTS

The distinguishing feature of the method of the present invention for converting biomass material resides in the use of an entrained pyrolyzer-entrained gasifier device in which dried biomass material is pyrolyzed in the presence of a hot, inert carrier gas formed by the combustion of pyrolysis oil and stoichiometric air and the char and oil products produced in the pyrolysis device are gasified in the presence of a hot gaseous mixture of steam and oxygen, preferably pure oxygen, to form synthesis gas. The present process is not a conventional one-step pyrolysis/gasification technique.

The process of the present invention can be regarded in terms of three basic operations in which a biomass material is initially dried and sized and, thereafter, the treated biomass material is pyrolyzed by entrained pyrolysis to yield a gas, an oil and a char. In the third phase of the process, the char and a portion of the oil are converted to synthesis gas. Suitable biomass materials which can be employed in the present process include all biomass materials which have been conventionally used as biomass feedstock materials such as wood chips, saw dust, and the like from trees, other terrestial plants, algae, agricultural and silvicultural residues and wastes, the carbonaceous portion of municipal wastes and the like.

In the first stages of the present invention, an appropriate biomass feedstock is dried and sized for use in the entrained pyrolysis device. Referring to FIG. 1, green wood chips, as an exemplary biomass feedstock, are conveyed from wood chip delivery system 1 via line 3 to cyclone separator 5 located at the top of the wet feed storage bin 7 where the wet wood chips are separated from the conveying air and allowed to drop into bin 7 via line 8. The conveying air is recycled through line 9 to the wood delivery system 1. After temporary storage in bin 7, the wood chips are conveyed by air through line 11 into the drying chamber 14 of dryer 13. Heat for drying the green, wet wood chips in dryer 13 is generated in burner/mixer 16 by the combustion of the combustible components in the scrubbed pyrolysis gas obtained from the entrained pyrolysis unit via line 17 with preheated air from line 19. Pyrolysis oil from the entrained pyrolysis unit is obtained via line 15 if required.

After the green wood chips have been sufficiently dried in drying chamber 14, the dried chips are conveyed by air in the dryer and air admitted into the drier through line 21 from the dryer through line 23 into cyclone separator 25 at the top of dry wood chip storage bin 27. The moisture content of wood chips or biomass feedstock utilized at this stage should be less than 10%, preferably 5 to 6%. Most preferably, the wood chips have a mositure content of about 6%. The wood chips which separate from the air in separator 25 fall into bin 27 via line 26 and the air discharged from separator 25 which contains wood chip fines is then conveyed through line 28 to cyclone separator 29. In the meantime, air in drying chamber 14 which contains wood fines which does not enter line 23 exits chamber 14 via line 30 where it is divided into two steams 31 and 33. The gases in line 31 are recirculated to burner/mixer 16 while the wood chip fines bearing air in line 33 is conveyed to cyclone separator 29 where it joins wood chip fines bearing air from line 28. The wood chip fines separated in cyclone separator 29 are discharged into wood chip grinder 35 via line 36 where they join dry wood chips entering grinder 35 through line 37 from dry wood chip storage bin 27. The wood chips or biomass feedstock at this point preferably should be of a size range less than about ⅛ inch, although this dimension is not critical to the process. Air freed of wood chip fines is discharged to the atmosphere from separator 29 via line 39. Conveying air is brought into the grinder 35 via line 41 to convey the sized wood particles via line 43 to cyclone separator 45 at the top of the wood chip metering system 47. Sized wood particles from the metering system are conveyed via line 48 into the pyrolysis section of entrained pyrolyzer-entrained gasifier 50. The metering system can be any mechanical device which accurately controls the rate of feeding the ground biomass into the pyrolyzer. For example, a calibrated screw could be used. The rate of feed to the unit depends upon the amount of biomass processed in a 24-hour period. As an example, for an 850-dry-ton per day plant, the rate of feed of biomass with a 6 percent moisture content would be about 75,350 pounds per hour. Air bearing wood fines from separator 45 flows through line 40 to separator 29 where wood chip fines are separated from air and returned to the system.

In order to conduct pyrolysis of processed wood chips in the entrained pyrolysis chamber of unit 50, pyrolysis oil from line 51 and a stoichiometric amount of preheated air from line 53 are discharged into burner 52 where combustion occurs and a hot carrier gas containing primarily nitrogen, steam and $CO_2$ is discharged into the pyrolysis chamber of unit 50 via line 55 where it is intimately mixed with ground wood particles fed into the chamber. The pressure of the carrier gas in the pyrolysis chamber is normally maintained at a level ranging from one to five atmospheres. Pyrolysis occurs at a temperature sufficient to thermally decompose the wood particles into volatile materials and a char and ash. The temperature ranges from 900° F. to 1600° F. The residence time is usually about one second or less, although longer residence times may be used. All of the products of pyrolysis are discharged from the pyrolysis chamber via line 57 into hot cyclone separator 59 where separation of the char and ash from the volatile materials occurs.

All of the volatile materials from separator 59 pass through air preheater 63 from line 61. The pressure of the volatile material passing into preheater 63 is dropped and controlled by throttle valve 62 to approximately one atmosphere. Air which enters preheater 63 from line 64 is heated to a high temperature, usually about 770° F. This temperature is not critical with the function of preheater 63 being to provide a means of efficiently using some of the waste heat of the system. The heated air flows from preheater 63 through line 19 to mixer/burner 16. The temperature at which the air leaves 63 is dependent upon the temperature and quantity of volatile material entering 63 from line 61 and the quantity of air from 64; however, the exit air should leave preheater 63 relatively close to 770° F. In this manner, some of the waste heat from the pyrolysis step is efficiently employed to dry green feedstock material. The pyrolysis gases and vapors discharged from preheater 63, normally at a temperature of at least 500° F., pass into scrubber 67 via line 65. In scrubber 67, the pyrolysis gases and vapors are scrubbed with pyrolysis oil obtained from oil cooler 70 via line 69 and cooled thereby until the temperature of the gas stream which exits the scrubber through line 17 to mixer/burner 16 is sufficiently low to assure condensation of most of the oil vapors. This temperature is usually between 170° F. and 200° F. The liquid mixture of pyrolysis oil and water which forms in the scrubber 67 leaves the same via line 71 and passes into filter unit 73. Char fines as well as some pyrolysis oil are discharged from filter 73 via line 75 where the mixture eventually is combined with char material from line 76 recovered in separator 59. The combined char material is then conveyed through line 77 to char storage bin 79.

The char-free pyrolysis oil which is discharged from filter 73 via line 81 enters oil cooler 70 where it is cooled normally to a temperature of approximately 120° F. After cooling, the "newly produced" pyrolysis oil is discharged through line 83 into oil storage facility 85 which supplies pyrolysis oil as a fuel for dryer 13 and for providing the energy for the entrained pyrolysis and, with the char, for the entrained gasification operations. Pyrolysis oil leaving storage facility 85 through line 86 is divided into two streams. The one flowing in line 51 supplies fuel for burner 52 for the pyrolysis chamber and the other one flowing in line 88 supplies fuel for burner 90 for the gasification chamber.

Cooling water from the pyrolysis oil cooler 70 is discharged from cooler 70 via line 87 into cooling tower 89. Some of the water in tower 89 is recycled by line 84 to cooler 70 where it functions as the cooling medium for the cooling of pyrolysis oil. Wastewater not used in the system is discharged through line 91, while water required for the scrubbing of product gas obtained from the entrained gasifier is discharged from the cooling tower through line 116.

Gasification of some of the pyrolysis oil and the char obtained from pyrolysis chamber of unit 50 occurs in the entrained gasifier in the presence of steam and oxygen, preferably essentially pure oxygen, to yield the desired synthesis gas product. Steam alone could be used in the gasification chamber, but some source of heat must be provided to maintain proper temperature level. Therefore, combinations of steam and $O_2$ are preferably used. The pyrolysis oil is used to supply heat and to increase overall conversion efficiency of the process. Referring to the FIGURE, char from storage bin 79 is discharged via line 80 into pulverizer unit 92 where the char is ground to a particle size sufficient for gasification. Oxygen, preferably essentially pure oxygen, is passed into burner 90 of the gasifier through line 96 along with pyrolysis oil from line 88 where reaction occurs. Simultaneously, steam is injected into burner 90 through line 95 and the mixed hot gases from burner 90 entrain pulverized char present in mixer 94, obtained from pulverizer 92 through line 93, and transport it into the gasifier chamber of unit 50. Gasification of the char, which occurs by the reaction of the char with steam and any $CO_2$ present from combustion of oil, normally occurs at a temperature ranging from 1700° F. to 2700° F., with the pressure within the gasifier ranging from one to 10 atmospheres. Residence times and temperatures are selected so as to achieve essentially complete gasification of the char. A portion of the ash is removed from the gasifier effluent in cyclone separator 97 through line 98. The hot gases are discharged from separator 97 through line 99 into cyclone separator 100 for removal of the remainder of the ash via line 101. The hot gas discharged from separator 100 through line 103 is passed through an energy recovery system starting with superheater 105 where heat exhcange occurs between raw syngas and steam entering superheater 105 from boiler 106. Super-heated steam is discharged from superheater 105 through line 95 to burner 90. The raw syngas which passes through boiler 106 where heat exchange occurs with hot water from economizer 110 leave the boiler through line 107 and enter air preheater 109 where compressed air entering the preheater 109 through line 111 is heated to an elevated temperature at a pressure ranging from one to 10 atmospheres, preferably 10 atmospheres. Heated air leaves preheater 109 through line 53 for pyrolysis burner 52. The raw syngas proceeds through economizer 110 and, via line 113, flows to product gas scrubber 115 where the raw syngas, now substantially cooler, is scrubbed by cooling water obtained via line 116 from cooling tower 89 to remove residual carbon dioxide and water vapor therefrom. The desired synthesis gas product, consisting of carbon monoxide and hydrogen, leaves scrubber 115 via line 117.

Boiler feedwater, for eventual conversion to superheated steam which is used as an essential reactant in the gasifier, enters economizer 110 via line 119 where it is preheated before it enters boiler 106 via line 121 and proceeds through superheater 105 where it is further heated and discharged into line 95 as superheated steam.

Returning to scrubber 115, scrub water containing residual particles of ash scrubbed from the raw syngas is removed through line 123 and passed with suitable control by throttle valve 124 into filter 125. The throttle valve reduces the pressure to atmospheric. Ash is removed from filter 125 through line 127 while filtered water is removed from filter 125 by line 129 and returned to cooling tower 89.

A distinct advantage of the present invention is that thermal decomposition of the biomass feed material and gasification are separated into two separate processes. Because of this feature thermal decomposition is controlled such that pyrolytic products from the biomass feed material are initially and separately obtained so that, when gasification to synthesis gas is desired, synthesis gas can be obtained free of other gaseous materials by simply reacting biomass char and pyrolysis oil in the presence of steam and oxygen, preferably essentially pure oxygen.

Another advantage of the present process is that hot inert gases are employed to entrain biomass particles during pyrolysis to supply the heat necessary to decompose biomass feedstock into pyrolysis gases and char. Moreover, when the char and oil are converted to synthesis gas product, a mixture of steam and oxygen, preferably essentially pure oxygen, is employed to effect the conversion. Combinations of steam and oxygen can be used.

Still another advantage of the present process is that slagging of the ash in the char does not occur while the char particles are entrained by the hot gases. As the char gasifies it chemically cools below the fusion point and therefore the ash is in the form of solid particles by the time it exits the gasifier.

Because entrained pyrolysis of the biomass and gasification of the char and pyrolysis oil occur separately, means are provided for a high throughput of materials and therefore a large capacity is provided for the processing of material.

Yet a further advantage of the present process is that a synthesis gas product is obtained of a purity sufficient for use as a feedstock for a variety of synthetic processes which produce methanol, ammonia, methane, and other hydrocarbons by a multitude of well known processes.

Having generally described this invention, a further understanding can be obtained by reference to the certain specific example which is provided herein for purposes of illustration only and is not intended to be limiting unless otherwise specified.

The apparatus and flow process shown in the Figure were employed as a basis for predicting the performance of a large-scale unit processing 1700 tons/day of wet green wood chips. Wood chips at 50 percent moisture (wet basis) enter dryer 14 where they are dried to six percent moisture before entering grinder 35, which precedes the entrained pyrolyzer. The feed streams to the pyrolyzer chamber of unit 50 include ground wood particles, heavy pyrolysis oil, and air. The air flow rate is the theoretical air required for the complete combustion of the heavy oil. The heavy oil flow rate is that required to meet the energy requirements for adiabatic pyrolysis, with an exit stream temperature range of 900° F. to 1600° F. The pyrolysis products consist of char, heavy oil vapors, gases and water vapor (from pyrolysis as well as from the residual water in the wood entering the pyrolyzer).

After leaving the pyrolyzer chamber of unit 50, the char is separated from the effluent in a hot cyclone 59 and the char is used as feed to the gasifier. The hot gases and vapors from the pyrolyzer chamber pass to the air preheater 63 used to preheat combustion air for unit 16. The pyrolysis gases and vapors are cooled to about 500° F. in the air preheater 63. This mixture then enters the pyrolysis-gas scrubber 67, which is operated with recirculated, cooled heavy pyrolysis oil. The remaining gases leave the scrubber at about 200° F., a temperature sufficiently high to prevent water condensation. These gases are then mixed with the preheated air and burned in the burner/mixer 16. Excess air is used in the dryer. The air preheater produced an exit air temperature of about 770° F. The heating value of the scrubbed gases and the energy available in the heated air are such that there is sufficient energy available to supply almost all drying needs.

The entrained gasifier feed streams consist of pulverized char (from the pyrolyzer), gaseous oxygen, superheated steam and all of the oil. The effluent from the gasifier consists primarily of $CO_2$, $CO$, $H_2$ and $H_2O$. The oxygen and steam enter at about 75° F. and approximately 1200° F., respectively. Their flow rates are such that a good thermal match exists between the sensible energy in the exit gas stream from the gasifier and the energy requirements for the steam generation for the gasifier and the preheated air for the pyrolyzer.

The raw syngas leaving the gasifier passes through superheater 105, boiler 106, air preheater 109 and economizer 110 before being scrubbed in scrubber 115 to remove the residual fly ash and carbon dioxide, lower the temperature, and reduce the moisture content. After leaving the gasifier, the raw syngas is cooled quickly so that further chemical reactions do not take place.

EXAMPLE

The detailed description of the preferred embodiments presented above is based on the stream shown in the Figure. The mass flow rates, pressures and temperatures are presented in Table 1 as an example of a plant processing 850 dry tons of wood chips per day. This syngas is well suited for methanol synthesis, ammonia synthesis, and methane synthesis.

TABLE 1

| | EXAMPLE OF 850 DRY TONS/DAY PLANT | | | |
|---|---|---|---|---|
| Stream Number | Material | Flow Rate (tons/day) | Pressure (Atmospheres) | Temperature (°F.) |
| 3 | Wet Wood Chips and Conveying Air | 1,700.0 + $AR_3$* | 1 | 75 |
| 8 | Wet Wood Chips | 1,700.0 | 1 | 75 |
| 9 | Conveying Air | $AR_3$ | 1 | 75 |

TABLE 1-continued
EXAMPLE OF 850 DRY TONS/DAY PLANT

| Stream Number | Material | Flow Rate (tons/day) | Pressure (Atmospheres) | Temperature (°F.) |
|---|---|---|---|---|
| 11 | Wet Wood Chips | 1,700.0 | 1 | 75 |
| 21 | Conveying Air | $AR_{21}$ | 1 | 75 |
| 30 | Dryer Exhaust Gases | 2,923.3 + $AR_{31}$ | 1 | 200 |
| 31 | Recirculated Dryer Exhaust Gases | $AR_{31}$ | 1 | 200 |
| 33 | Dryer Exhaust Gases | 2,923.3 | 1 | 200 |
| 23 | Wood Chips and Conveying Air | 904.2 + $AR_{21}$ | 1 | NA+ |
| 26 | Wood Chips | 904.2 | 1 | NA |
| 28 | Conveying Air | $AR_{21}$ | 1 | NA |
| 40 | Conveying Air | $AR_{41}$ | 1 | NA |
| 36 | Wood Fines | TTBZ** | 1 | NA |
| 39 | Exhaust Gases | 2,923.3 + $AR_{21}$ + $AR_{41}$ | 1 | NA |
| 37 | Wood Chips | 904.2 | 1 | 75 |
| 41 | Conveying Air | $AR_{41}$ | 1 | 75 |
| 43 | Ground Wood and Conveying Air | 904.2 + $AR_{41}$ | 1 | NA |
| 48 | Ground Wood | 904.2 | 5 | 75 |
| 51 | Pyrolysis Oil | 36.3 | 5 | 140 |
| 53 | Preheated Air | 352.8 | 5 | 600 |
| 55 | Combustion Products | 389.0 | 5 | NA |
| 57 | Char, Oil Vapors and Gas | 1,293.3 | 5 | 1,000 |
| 76 | Char | 245.7 | 1 | 1,000 |
| 61 | Oil Vapors and Gas | 1,047.6 | 5 | 1,000 |
| 65 | Oil Vapors and Gas | 1,047.6 | 1 | 500 |
| 64 | Dryer Air | 1,179.8 | 1 | 75 |
| 19 | Preheated Dryer Air | 1,179.8 | 1 | 770 |
| 17 | Scrubbed Pyrolysis Gas | 947.8 | 1 | 200 |
| 71 | Pyrolysis Oil | 99.5 + $AR_{69}$ | 1 | 195 |
| 81 | Pyrolysis Oil | 99.5 + $AR_{69}$ | 1 | 195 |
| 75 | Char Fines and Pyrolysis Oil | TTBZ | 1 | 195 |
| 69 | Pyrolysis Oil | $AR_{69}$ | 1 | 120 |
| 83 | Pyrolysis Oil | 99.5 | 1 | 120 |
| 15 | Pyrolysis Oil | NR** | 1 | 140 |
| 86 | Pyrolysis Oil | 99.5 | 1 | 140 |
| 88 | Pyrolysis Oil | 63.2 | 5 | 170 |
| 77 | Char | 245.7 | 1 | NA |
| 80 | Char | 245.7 | 1 | 75 |
| 93 | Powdered Char | 245.7 | 5 | 75 |
| 96 | Oxygen | 200.3 | 5 | 75 |
| 95 | Steam | 328.4 | 34 | 1,200 |
| 98 | Ash | TTBZ | 1 | 1,830 |
| 99 | Gas | 837.3 | 5 | 1,830 |
| 101 | Ash | TTBZ | 1 | 1,830 |
| 103 | Gas | 837.3 | 5 | 1,830 |
| 107 | Gas | 837.3 | 5 | 820 |
| 113 | Gas | 837.3 | 5 | 295 |
| 117 | Gas | 713.2 | 5 | 100 |
| 119 | Water | 328.4 | 34 | 60 |
| 121 | Water | 328.4 | 34 | 465 |
| 111 | Compressed Air | 352.8 | 5 | 75 |
| 123 | Water + Ash | 124.1 + $AR_{116}$ | 5 | 100 |
| 127 | Ash | TTBZ | 1 | 100 |
| 129 | Water | 124.1 + $AR_{116}$ | 1 | 100 |
| 84 | Water | $AR_{84}$ | 1 | 90 |
| 87 | Water | $AR_{84}$ | 1 | 100 |
| 116 | Water | $AR_{116}$ | 5 | 90 |
| 91 | Water | 124.1 WE*** | 1 | 90 |

*$AR_n$ - As required for stream number "n"
+NA - Not assessed
**TTBZ - Taken to be zero in mass and energy analysis
++NR - None required
***WE - Water evaporated in cooling tower

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A method of converting biomass raw material to synthesis gas comprising;
drying and sizing said biomass raw material;
introducing said biomass raw material into an entrained pyrolysis chamber;
pyrolyzing said biomass raw material with pyrolysis oil and preheated air and intimately mixing said entrained biomass raw material and pyrolysis oil and air with a hot inert gaseous mixture and conveying the mixture through the entrained pyrolysis chamber, thereby obtaining a product mixture of char, pyrolysis oil and pyrolysis gas, said pyrolysis gas being fed back for use in at least said drying step; and
gasifying said char and pyrolysis oil in the presence of steam and oxygen by conveying the char, oil, steam, and oxygen through a flow reactor, at a temperature sufficient to form said synthesis gas product consisting essentially of carbon monoxide and hydrogen.

2. The method of claim 1, wherein said biomass raw material is dried by subjecting said feedstock to heat generated by the combustion of pyrolysis gas, pyrolysis oil, as required, and preheated air until a moisture content ranging from 6% to 10% is obtained, and then grinding said dried feedstock to a particle size less than ⅛ inch.

3. The method of claim 2, wherein said biomass feedstock is green wood chips dried to a moisture content of about 6%.

4. The method of claim 2, wherein in said pyrolysis said dried and ground feedstock is conveyed into an entrained pyrolyzer with a hot carrier gas generated by the combustion of pyrolysis oil with preheated air and pyrolyzed at a temperature ranging from 900° F. to 1600° F., thereby producing said product mixture.

5. The method of claim 2, which further comprises heating air with said pyrolysis gas for use as said preheated air for the combustion of said pyrolysis gas and oil for the drying of said feedstock.

6. The method of claim 5, wherein said air is preheated to an elevated temperature above 500° F.

7. The method of claim 6, wherein said heated air is at a temperature of about 770° F.

8. The method of claim 1, which further comprises;
continuously reacting a mixture of oxygen, pyrolysis oil and char obtained from said pyrolysis, and steam, thereby forming a hot gaseous stream; and
passing said stream into a gasifier at a temperature of 1700° F. to 2700° F.

9. The method of claim 8, wherein said synthesis gas product contains ash which upon emergence from said gasifier is separated from said synthesis gas product.

10. The method of claim 9, wherein said hot, substantially ash-free gas is passed sequentially through an energy recovery system prior to passing into a product gas scrubber where said gas is scrubbed to remove carbon dioxide and residual ash therefrom, said scrubbed gas exiting said scrubber at a temperature of approximately 100° F.

11. The method of claim 10, which further comprises:
passing compressed air into an air preheater where said compressed air is heated by heat exchange with said hot synthesis gas, and then
discharging said preheated air at an elevated temperature to the pyrolysis burner where said air burns pyrolysis oil to generate the heat and inert carrier gas for pyrolysis of said biomass feedstock.

12. The method of claim 11, wherein said preheated air is at a temperature of about 600° F.

13. The method of claim 10, which further comprises;
initially heating feedwater in an economizer of said energy recovery system to an elevated temperature by heat exchange with said hot synthesis gas;
heating said initially heated water to saturated steam in a boiler;
further heating said saturated steam to superheated steam in a superheater of said energy recovery system by heat exchange with said hot synthesis gas; and
discharging said superheated steam to a burner of said gasifier where it is mixed with oxygen and pyrolysis oil.

14. The method of claim 13, wherein said feedwater is heated to a temperature of about 465° F. in said economizer, and said hot water is heated to produce saturated steam at a pressure of about 34 atmospheres and ultimately superheated steam at a temperature of about 1200° F. and a pressure of about 34 atmospheres.

15. An apparatus for the conversion of biomass raw material to synthesis gas, comprising:
means for drying said biomass raw material;
means for grinding said dried biomass raw material;
pyrolyzer means for pyrolyzing said ground biomass raw material at a temperature of 900° to 1600° F. as said material is intimately mixed with an inert carrier gas stream yielding a product mixture of pyrolysis oil, pyrolysis gas and char; means for feeding said pyrolysis gas back for use by at least said drying means; and
gasifier means for gasifying said char in the presence of steam and oxygen to a synthesis gas product consisting essentially of carbon monoxide and hydrogen.

16. The apparatus of claim 15, which further comprises:
means for burning a mixture of said pyrolysis gas, pyrolysis oil and preheated air to supply heat for said drying means.

17. The apparatus of claim 15, further comprising:
means for metering the feeding of said ground biomass to said pyrolyzer means.

18. The apparatus of claim 15, further comprising:
means for separating char from said product mixture evolved from said pyrolyzer means; and
means for preheating air to an elevated temperature which is used for the burning of pyrolysis gas and pyrolysis oil for the heating of said biomass raw material by heat exchange with said hot substantially char-free product mixture.

19. The apparatus of claim 16, which further comprises:
means for pulverizing said char;
means for reacting pyrolysis oil and char with oxygen in the presence of injected steam to provide the heat for said gasifier means; and
means for gasifying said char at a temperature of 1700° F. to 2700° F.

20. The apparatus of claim 16, further comprising:
means for separating substantially most of the ash in the synthesis gas product discharged from said gasifying means.

21. The apparatus of claim 20, further comprising:
means for heating compressed air for use in burning pyrolysis oil to form the inert carrier gas stream for said pyrolyzer means, to an elevated temperature and an elevated pressure, the heating occurring by heat exchange between said compressed air and said substantially ash free, hot synthesis gas.

22. The apparatus of claim 20, further comprising:
means for heating boiler feedwater to steam for entrainment of said char in said gasifier means, said means comprising the sequential order of an economizer means, a boiler means and a superheater means through which said boiler feedwater passes for conversion to superheated steam pressure and through which said substantially ash free synthesis gas product flows in reverse order to effect heating of said feedwater by heat exchange.

23. The apparatus of claim 20, 21 or 22, further comprising:
means for scrubbing said substantially ash free synthesis gas product with water to remove residual quantities of ash therefrom as well as carbon dioxide; and
means for filtering residual ash from said scrubbing water.

* * * * *